United States Patent [19]
Binks et al.

[11] 3,870,890
[45] Mar. 11, 1975

[54] METHOD AND APPARATUS FOR MEASURING MUTUALLY PERPENDICULAR DIMENSIONS

[75] Inventors: Sidney David Binks; William Hurton, both of Sheffield, England

[73] Assignee: Davy Instruments Limited, Sheffield, England

[22] Filed: Nov. 30, 1973

[21] Appl. No.: 420,708

[30] Foreign Application Priority Data
Dec. 1, 1972 Great Britain.................... 55478/72

[52] U.S. Cl.................. 250/560, 250/571, 356/160
[51] Int. Cl.............................................. G01b 7/04
[58] Field of Search .......... 250/221, 222, 236, 571, 250/578, 560; 356/159, 160, 167

[56] References Cited
UNITED STATES PATENTS
| | | | |
|---|---|---|---|
| 3,441,739 | 4/1969 | Clark et al. ........................ | 250/560 |
| 3,461,299 | 8/1969 | Felix .................... | 250/560 |
| 3,761,182 | 9/1973 | Kubisiak et al. .................... | 356/160 |
| 3,787,700 | 1/1974 | Chasson............................ | 250/560 |

Primary Examiner—Walter Stolwein
Attorney, Agent, or Firm—Brisebois & Kruger

[57] ABSTRACT

The specification discloses a method of, and apparatus for, determining two mutually perpendicular cross-sectional dimensions of an elongate workpiece such as metal bar issuing from a bar mill. A narrow beam of light from a single source is scanned repeatedly in a direction parallel to one of the dimensions at a known speed across the workpiece and between each scan the light beam is scanned across the workpiece parallel to the other dimension, the time during which the light beam impinges on the workpiece during each scan is measured and the first dimension is calculated electronically from a plurality of scans across that dimension, and the second dimension is calculated electronically from a plurality of scans across that dimension. The method and apparatus may be modified so that from a single light source the workpiece is scanned simultaneously across both dimensions with successive scans being in opposite directions.

15 Claims, 2 Drawing Figures

METHOD AND APPARATUS FOR MEASURING MUTUALLY PERPENDICULAR DIMENSIONS

This invention relates to a method of, and apparatus for, determining first and second mutually perpendicular cross-sectional dimensions of an elongate workpiece. The workpiece may be moving in the direction of its length during the measuring operation and a particular, but not sole, application of the invention is to the determination of two mutually perpendicular cross-sectional dimensions of a rod issuing from a rolling mill. If the rod is of substantially circular cross-section then the two dimensions which are measured are diameters of the rod.

According to a first aspect of the present invention in a method of determining first and second mutually perpendicular cross-sectional dimensions of an elongate workpiece a narrow light beam from a single source is directed parallel to said first dimension and repeatedly scanned across a zone containing the workpiece at a known speed in the same direction parallel to said second dimension, between each of said scans the light beam directed parallel to said second dimension is scanned across the workpiece in the zone at a known speed in the same direction parallel to said first dimension, the time during which the light beam impinges on the workpiece is measured for each scan, and from the results of a plurality of the scans in the direction parallel to said first dimension said first dimension is determined electronically and the second dimension is determined electronically from the results of a plurality of the scans in the direction parallel to said second dimension.

As the speed at which the beam of light is scanned at right angles to the predetermined direction is known, an accurate measurement of the length of time the beam impinges on the workpiece provides the value of the cross-sectional dimension of the workpiece in the direction of movement of the light beam. As the beam of light is parallel to the predetermined direction, movement of the workpiece within the measuring zone and in the direction parallel to said predetermined direction does not affect the time during which the beam of light impinges on the workpiece.

In order to obtain a more accurate value for the cross-sectional dimensions of the workpiece, the beam of light is repeatedly scanned in each of said directions and the dimensions are determined electronically from the results of a plurality of scans, say of the order of 100 to 200 scans.

The invention may be modified in that the light beam is split into two beams and the two beams simultaneously scan the workpiece in the directions parallel to said first and second dimensions respectively.

According to a second aspect of the invention apparatus suitable for determining first and second mutually perpendicular cross-sectional dimensions of an elongate workpiece comprises a measuring zone for receiving the workpiece, a single light source capable of producing a narrow beam of light, optical means for repeatedly scanning a beam of light from said source at a known speed across said zone normal to the length of the workpiece in the first direction and also in a second direction at right angles to said first direction, optical means for receiving light passing through said zone in the first direction and focussing said light on to a first photo-electric transducer capable of producing an electrical signal when light falls thereon, optical means for receiving light passing through said zone in said second direction and focussing said light onto a second photo-electric transducer capable of producing an electrical signal when light falls thereon and each transducer having electronic means associated therewith for calculating the time during which light is obscured from the transducer when a workpiece is present in the zone and hence from a plurality of scans the first and second dimensions respectively of the workpiece.

In the case of a moving workpiece, a high speed movement of the workpiece in the plane of the dimension being measured produces an error in the measured value of that dimension. The size of the error is proportional to the size of the workpiece and the speed of the movement relative to the speed at which the beam of light is caused to move at right angles to the predetermined direction. Since the movements of the workpiece are usually oscillatory this error can be reduced substantially by scanning each dimension of the workpiece successively in opposite directions and obtaining the dimension from a plurality of the scans across the dimension. It has been found that the dimensions can be determined accurately by calculating the result from a limited number, say four bi-directional scans.

It has been found convenient for the light source to take the form of a laser and for the scan means to comprise an $n$-sided polygon, where $n$ is of the order of 12, the polygon being driven by an electric motor having sophisticated speed control means so that the speed of the motor can be accurately set and maintained to be of a constant time for each scan across the workpiece.

In order that the invention may be more readily understood it will now be described, by way of example only, with reference to the accompanying drawings in which.

Figure 1:
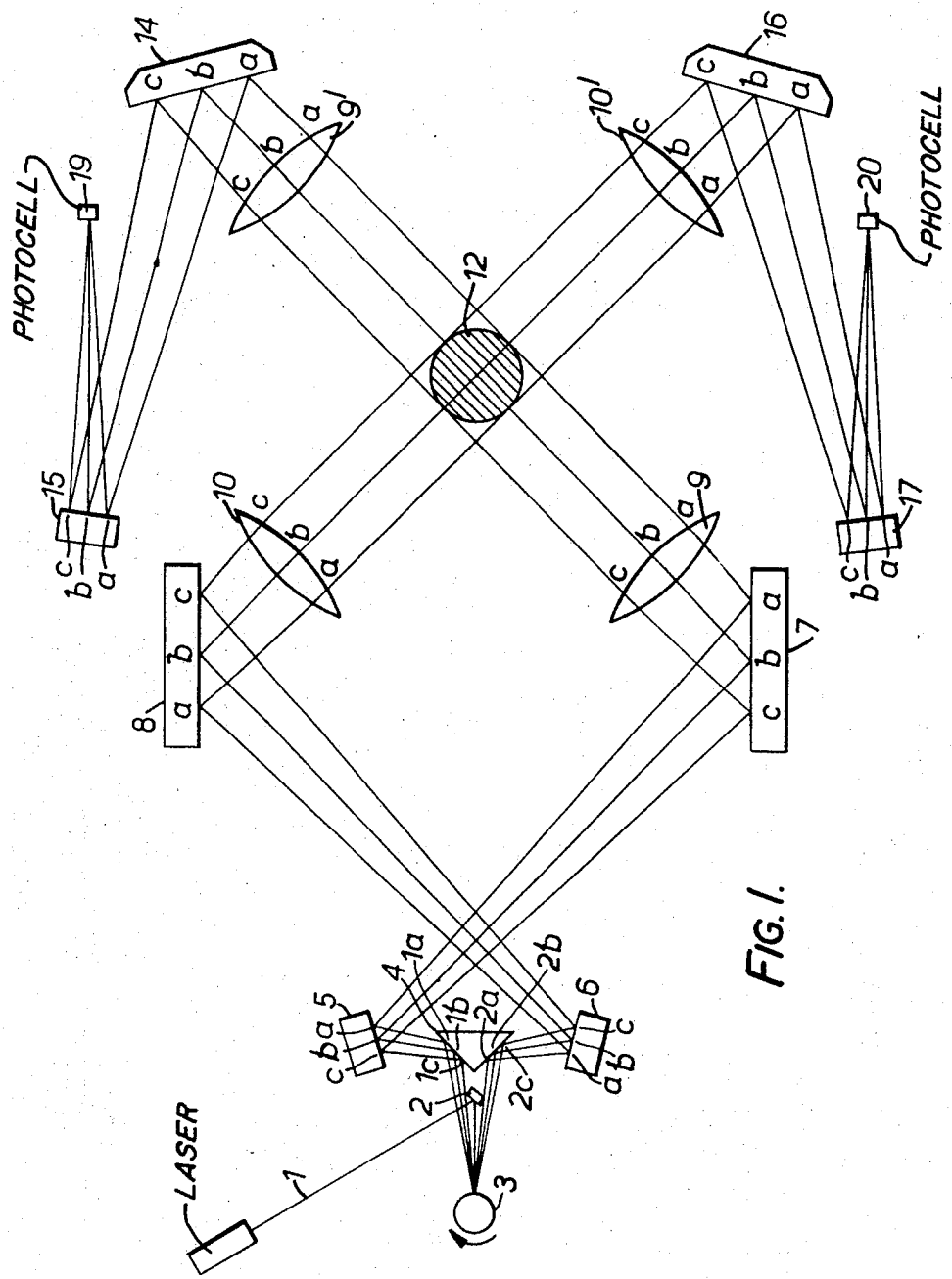
FIG. 1 shows diagrammatically a twin aspect of scanning system.
Figure 2:
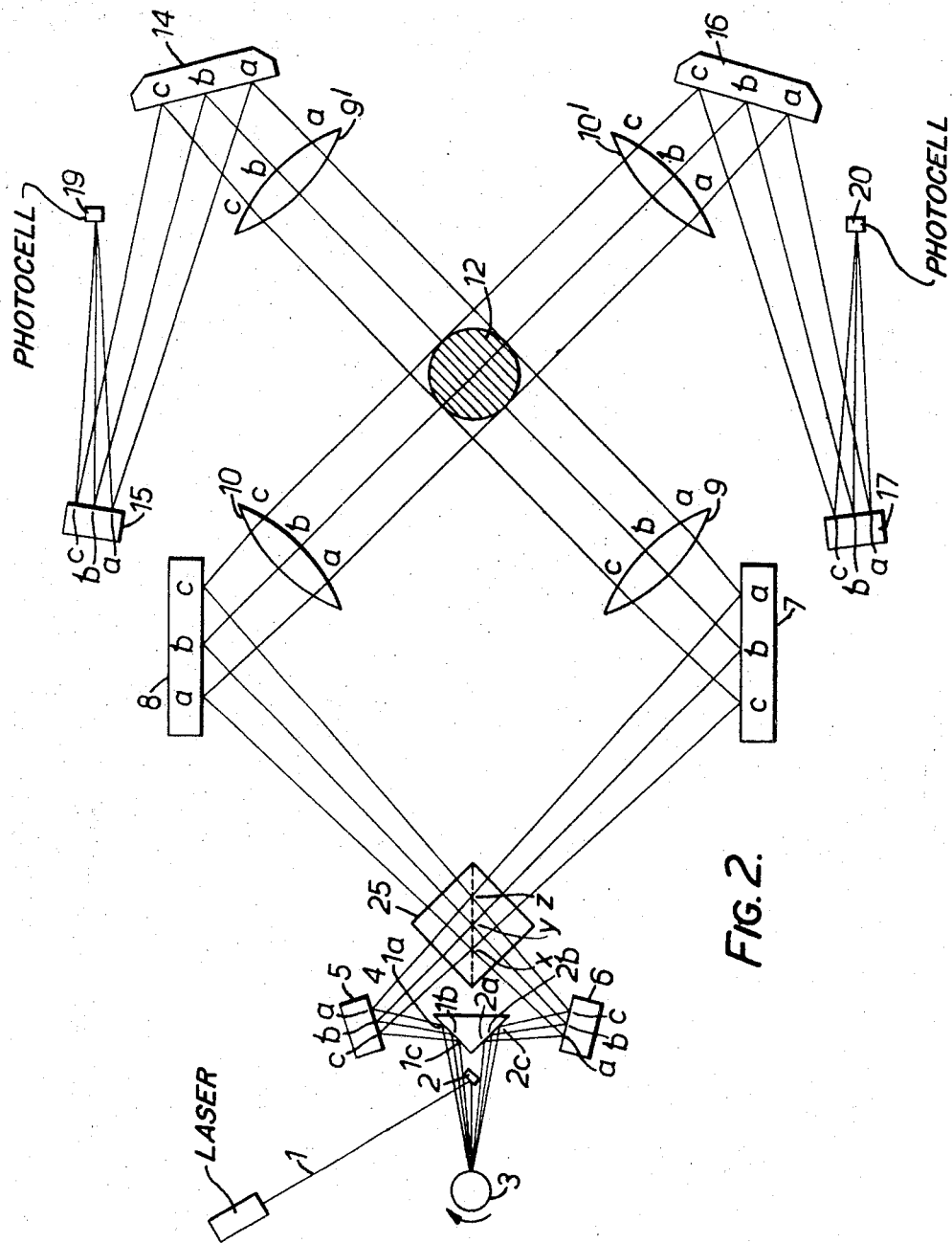
FIG. 2 shows a twin aspect bi-directional scanning system.

Referring to FIGS. 1 and 2, a pencil light beam 1 from a laser (not shown) is directed on to a stationary mirror 2 from where it is reflected on to a twelve sided polygon 3 rotated by an electric motor not shown. The motor is provided with a speed control equipment so that the speed of rotation of the motor and the polygon is constant. The light beam from the mirror 2 is directed on to each face of the polygon in turn and as the face is rotated through a small angle the light beam is scanned across a prism 4. During the first part of each scan when the light beam moves from position 1a to 1b to 1c the scanned beam is reflected onto a stationary mirror 5 and during the part of the scan in which the beam moves from positions 2a, 2b to 2c on the prism the beam is scanned onto a fixed mirror 6. From these mirrors the light is directed via further stationary mirrors 7 and 8 respectively and through collimating lenses 9 and 10 across a measuring zone 12. The part of the beam reflected by the mirror 8 extends across the measuring zone at right angles to the part of the beam reflected by the mirror 7. From the measuring zone the beams are collected by further collimating lenses 9' and 10' and on further reflection by mirrors 14 and 15 and 16 and 17 respectively the light beams are focussed onto a pair of energy receptive transducers in the form of photo-electric cells 19 and 20.

If there is no workpiece present in the measuring zone 12 the photo-electric cells 19 and 20 have beams of light directed upon them during each part of the scan but if a workpiece is positioned in the measuring zone with its longitudinal axis normal to the directions of the two scans then for part of each scan the light beams are obscured by the workpiece and light is prevented from falling upon the photo-electric cells. The time interval for each scan during which the beams are obscured by a workpiece is a measure of a dimension of the workpiece across which the beam is being scanned and it can be seen that the workpiece is being scanned in two directions which are mutually at right angles.

The following table indicates the paths taken by the pencil beams during each scan of the scanning means 3:

|  | ASPECT 1 |
|---|---|
| 3-1a-5a | 7a-9a-9'a-14a-15a-19 |
| 3-1b-5b | 7b-9b-9'b-14b-15b-19 |
| 3-1c-5c | 7c-9c-9'c-14c-15c-19 |
|  | ASPECT 2 |
| 3-2a-6a | 8a-10a-10'a-16a-17a-20 |
| 3-2b-6b | 8b-10b-10'b-16b-17b-20 |
| 3-2c-6c | 8c-10c-10'c-16c-17c-20 |

Referring now to FIG. 2, a 50–50 beam splitter block 25 is positioned between the mirrors 6 and 8 and 5 and 7 respectively. The beam splitter block consists of a square block of glass with a 50–50 transmission/reflection screen incorporated along the diagonal. The splitter screen is on the axis of symmetry of the system. The axes of the system intersect the splitter screen at 45° and the distance of the screen from the scanning mirror is the same for both scans. When the pencil beam of light strikes the splitter screen both reflected and transmitted beams are produced so that the measuring zone is scanned from both aspects simultaneously. The scanning of the measuring zone from both aspects is then repeated a short time later when the beam strokes the splitter screen from the other side, this time with the scans of both aspects moving in the opposite directions to the previous scans. Selected beam positions in the sequence they occur are tabulated below:

| PENCIL BEAM POSITIONS UP TO BEAM SPLITTER | BI-DIRECTIONAL TWO ASPECT |
|---|---|
| 3-1a-5a-25Z | Aspect 1 -7a-9a-9'a-14a-15a-19 |
|  | Aspect 2 -8c-10c-10'c-16c-17c-20 |
| 3-1b-5b-25Y | Aspect 1 -7b-9b-9'b-14b-15b-19 |
|  | Aspect 2 -8b-10b-10'b-16b-17b-20 |
| 3-1c-5c-25X | Aspect 1 -7c-9c-9'c-14c-15c-19 |
|  | Aspect 2 -8a-10a-10'a-16a-17a-20 |
| 3-2a-6a-25X | Aspect 1 -7c-9c-9'c-14c-15c-19 |
|  | Aspect 2 -8a-10a-10'a-16a-17a-20 |
| 3-2b-6b-25Y | Aspect 1 -7b-9b-9'b-14b-15b-19 |
|  | Aspect 2 -8b-10b-10'b-16b-17b-20 |
| 3-2c-6c-25Z | Aspect 1 -7a-9a-9'a-14a-15a-19 |
|  | Aspect 2 -8c-10c-10'c-16c-17c-20 |

The laser light source, the bi-directional optical scanning system, the photocells and photocell preamplifiers are housed in the measuring head which has an opening extending therethrough. The measuring zone 12 is located within the opening and the light beams pass through the opening by way of sealed glass ports arranged around the opening in the head. The workpiece to be measured is located in the opening and if necessary the measuring head may be water cooled to prevent the measuring head from becoming overheated due to the operating conditions encountered on line in a bar mill. The measuring head is mounted on a mounting frame and provision is made for rotating the measuring head relative to the frame so that the planes of the light beams which pass through the opening in the head can be rotated with respect to the longitudinal axis of a workpiece extending through the opening.

The logic circuitry and power supplies of the equipment are housed in an electronic cabinet which is positionable away from the measuring head.

Preferably the motor rotating the polygon 3 is a twin-phase synchronous motor and as the motor speed is directly related to the power supply frequency, to alter the motor speed and therefore the scan time it is only necessary to alter the input frequency to the motor. This may be done by a crystal controlled clock and associated circuitry.

Figure 3:
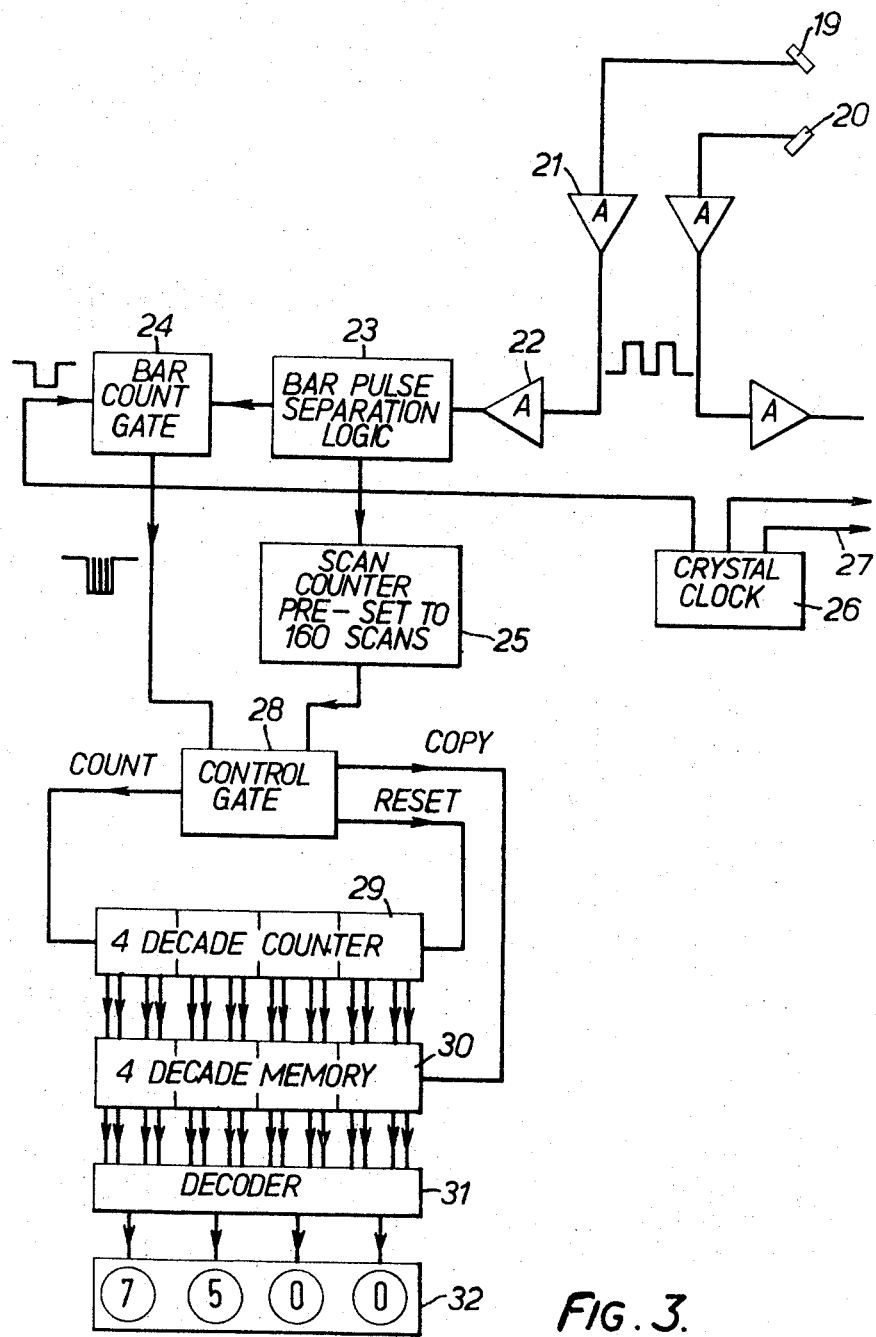

The measuring logic for the system forms two distinct channels, one for each of the two measuring aspects. Since both channels are identical only one will be described with reference to FIG. 3 of the accompanying drawings. The system operates to determine the dimensions of the workpiece being measured by measuring the time during each scan in which the beam of light is obscured from the photo-electric cell by the workpiece.

The signal from the photocell 19 is amplified in a preamplifier 21 and a further amplifier 22 and is passed to a pulse separation logic circuit 23. This circuit identifies the parts of the signal which correspond to the interval of time when the photocell 19 is first obscured from the beam by the workpiece and also when the light beam reappears on the photocell, and during this time interval a signal is applied to a bar count gate 24. A further signal indicating that a scan has taken place is transmitted from the circuit 23 to a scan counter 25.

A crystal clock 26 supplies fixed, known frequency, pulses to the bar count gate 24 of both channels and also serves to control the speed of the motor driving the mirror 3 by supplying pulses on a line 27. During the time interval of each scan in which the logic circuit 23 is supplying a signal to the gate 24, the gate allows the pulses from the clock 26 to be passed to a control gate 28. These pulses are fed via the gate to a four decade counter 29 and the scan counter 25 is set to a predetermined number of scans, say 160 scans. After every 160 scans the contents of the counter 29 is fed to a memory 30 and the counter is returned to zero by receiving a signal from the scan counter 25. The contents of the memory is divided by 160 to give the average count for one scan by a decoder 31 and the average count, which represents the dimension of the workpiece being measured, is shown on a display 32.

In an alternative arrangement not shown, the output of the bar count gate 24 is supplied to a digital comparator which also receives signals representing the desired cross-sectional dimension of the workpiece being measured. These two signals are compared over a limited number, say four, scans, and a difference signal representing the desired and the actual dimension of the workpiece is fed to a memory from which it is applied to a Digital to Analogue convertor in order to display the difference or error signal in analogue form. The memory is updated after four scans. The analogue output may be used to control the bar mill in the sense to correct the dimension of the workpiece being produced.

We claim:

1. A method of determining first and second mutually perpendicular cross-sectional dimensions of an elongate workpiece wherein a narrow light beam from a single source directed parallel to said first dimension is repeatedly scanned across a zone containing the workpiece at a known speed in a direction parallel to said second dimension, between each of said scans the light beam is directed parallel to said second dimension and scanned across the workpiece in the zone at a known speed in a direction parallel to said first dimension, the time during which the light beam impinges on the workpiece is measured for each scan, and by averaging the resulting impinging times of a plurality of the scans in the direction parallel to said first dimension said first dimension is determined electronically and the second dimension is determined electronically by averaging the resulting impinging times of a plurality of the scans in the direction parallel to said second dimension.

2. A method as claimed in claim 1 wherein the light beam scanned across the zone in the direction parallel to said first dimension falls upon a first photo-electric transducer except when the beam impinges upon the workpiece and the beam scanned across the zone in the direction parallel to said second dimension falls upon a second photo-electric transducer except when the beam impinges upon the workpiece.

3. A method as claimed in claim 2 wherein each photo-electric transducer produces an electrical signal when light falls thereon and cessation of the signal when the light beam initially impinges on the workpiece initiates the counting of a train of fixed frequency clock pulses and the re-appearance of the signal when the light beam moves off of the workpiece stops the counting of the pulses.

4. A method as claimed in claim 1 modified in that said light beam is split into two beams and said two beams simultaneously scan the workpiece in the directions parallel to said first and second dimension respectively, 5. A method as claimed in claim 4 wherein successive scans parallel to the same dimension are in opposite directions.

6. A method as claimed in claim 5 wherein the light beam scanned across the zone in the direction parallel to said first dimension falls upon a first photoelectric transducer except when the beam impinges upon the workpiece and the beam scanned across the zone in the direction parallel to said second dimension falls upon a second photo-electric transducer except when the beam impinges upon the workpiece.

7. A method as claimed in claim 6 wherein each photo-electric transducer produces an electrical signal when light falls thereon and cessation of the signal when the light beam initially impinges on the workpiece initiates the counting of a train of fixed frequency clock pulses and the re-appearance of the signal when the light beam moves off of the workpiece stops the counting of the pulses.

8. Apparatus suitable for determining first and second mutually perpendicular cross-sectional dimensions of an elongate workpiece comprising a measuring zone for receiving the workpiece, a single light source capable of producing a narrow beam of light, optical means for repeatedly scanning a beam of light from said source at a known speed across said zone in a first direction at right angles to the direction of the beam, successive scans being interdigitated with scans by the beam across the zone at a known speed in a second direction which is at right angles to the direction of the beam and at right angles to the first direction, optical means for receiving light passing through said zone in the first direction and focussing said light on to a first photo-electric transducer capable of producing an electrical signal when light falls thereon, optical means for receiving light passing through said zone in said second direction and focussing said light on to a second photoelectric transducer capable of producing an electrical signal when light falls thereon and each transducer having electronic means associated therewith for effecting measurements of the time during each scan in which light is obscured from the transducer when a workpiece is present in the zone, each of said measurements being representative of a dimension of the workpiece being scanned, and means for averaging the measurements from a plurality of scans in said first direction to determine the first dimension of the workpiece, and from a plurality of scans in said second direction to determine said second dimension of said workpiece.

9. Method as claimed in claim 2 in which the light beam falling upon each transducer is focussed on said transducer.

10. Apparatus as claimed in claim 8 wherein the optical scanning means includes means for splitting the light beam whereby said scans in the two mutually normal directions are made simultaneously.

11. Apparatus as claimed in claim 10 wherein said splitting means comprises a beam splitter block having an equal transmission/reflection screen whereby the light beam impinging thereon is split into two beams mutually at right angles.

12. Apparatus as claimed in claim 10 wherein said beam splitter block is associated with a prism which causes the light beam to be directed on to the screen first in one direction and then in a direction at right angles thereto whereby the two beams leaving the splitter block are scanned across the zone simultaneously in mutually perpendicular directions with successive scans in each of said directions being in opposite directions.

13. Apparatus as claimed in claim 8 wherein the optical means for scanning the light beam includes an $n$ sided reflecting polygon rotatable at a known constant speed.

14. Apparatus as claimed in claim 8 wherein the single light source is a laser.

15. Apparatus suitable for determining first and second mutually perpendicular cross sectional dimensions of an elongate workpiece comprising a measuring zone for receiving the workpiece, a laser, a mirror for reflecting a narrow light beam from the laser onto the reflecting surfaces of a rotatable $n$ sided polygon, means for rotating said polygon at a known constant speed, a prism arranged to receive the reflected light from the polygon and to reflect the beam in one direction during the first part of the scan and in another direction during the second part of the scan, optical means for directing the beam during the first part of the scan across the measuring zone, optical means for focussing the beam passed across the zone onto a first photo-electric transducer, electronic means associated with the transducer for determining the time during each scan in which the beam impinges upon a workpiece in the zone and electronic means for determining the dimension of the workpiece from a plurality of scans, optical means for directing the beam during the second part of each scan across the measuring zone in a direction at right angles to the beam during the first part of each scan, optical means for focussing the beam passed across the zone during the second part of each scan onto a second photo-electric transducer, electronic means associated with the second transducer for determining the time during each scan in which the beam impinges upon a workpiece in the zone and electronic means for determining the dimension of the workpiece from a plurality of scans.

* * * * *